United States Patent [19]

Henderson et al.

[11] Patent Number: 5,117,695
[45] Date of Patent: Jun. 2, 1992

[54] VIBRATION ATTENUATION ASSEMBLY

[75] Inventors: Frederick H. Henderson, Huntsville; Roy D. Whitehead, Decatur, both of Ala.

[73] Assignee: Teledyne Industries, Inc., Los Angeles, Calif.

[21] Appl. No.: 597,717

[22] Filed: Oct. 12, 1990

[51] Int. Cl.$^5$ .............................. G01P 1/02
[52] U.S. Cl. ...................... 73/493; 73/496; 73/430; 73/431
[58] Field of Search ............. 73/496, 493, 500, 430, 73/431; 248/562, 603, 636

[56] References Cited

U.S. PATENT DOCUMENTS

| | | | |
|---|---|---|---|
| 2,752,466 | 8/1954 | Bonnell | 73/430 |
| 3,104,552 | 9/1963 | Bouchard | 73/516 R |
| 3,160,237 | 8/1961 | Reason et al. | 73/430 |
| 3,161,065 | 12/1964 | Riordan et al. | 73/516 R |
| 3,813,946 | 6/1974 | Robbins, Jr. et al. | 73/430 |
| 4,019,389 | 4/1977 | LaSala et al. | 73/430 |
| 4,159,502 | 6/1979 | Mayer | 73/430 |
| 4,525,081 | 6/1985 | Myhre | 73/432 R |
| 4,648,273 | 3/1987 | Ozols | 73/516 LM |
| 4,728,086 | 3/1988 | Ishiyama et al. | 248/562 |

FOREIGN PATENT DOCUMENTS 0802579  10/1958  United Kingdom ............... 248/562

Primary Examiner—Hezron E. Williams
Assistant Examiner—Rose M. Finley
Attorney, Agent, or Firm—Beveridge, DeGrandi & Weilacher

[57] ABSTRACT

The present invention features a vibration attenuation assembly designed for the protection of single axis instruments such as accelerometers. The assembly includes an inner cylinder housing one or more single axis accelerometers co-aligned with a principle axis of the cylinder. The inner cylinder is suspended by three or more equally spaced springs at each end. In one embodiment, damping fluid is maintained between the inner cylindrical surface of the housing and the suspended cylinder to provide damping and a thermal path. The springs also function as electrical conductors for transmitting power and signals to the accelerometer. Damping fluid retention between the inner and outer cylinder can be accomplished by use of a diaphragm or bellows as a physical barrier. Alternatively, retention of the damping fluid can be accomplished without a physical barrier by use of fluid adhesion which has particular applicability in low gravity environments such as space. Damping can also be accomplished through use of eddy current damping structures or by the inclusion of damping material to the springs. An alternate spring system uses fluid springs which are maintained in wells and are formed of a conductive material. A securement system for preventing dispersion of the fluid spring when large accelerations are anticipated is also provided. In addition, a fixing structure which locks the inner cylinder to the outer cylinder can be used when high gravitational forces are anticipated.

33 Claims, 5 Drawing Sheets

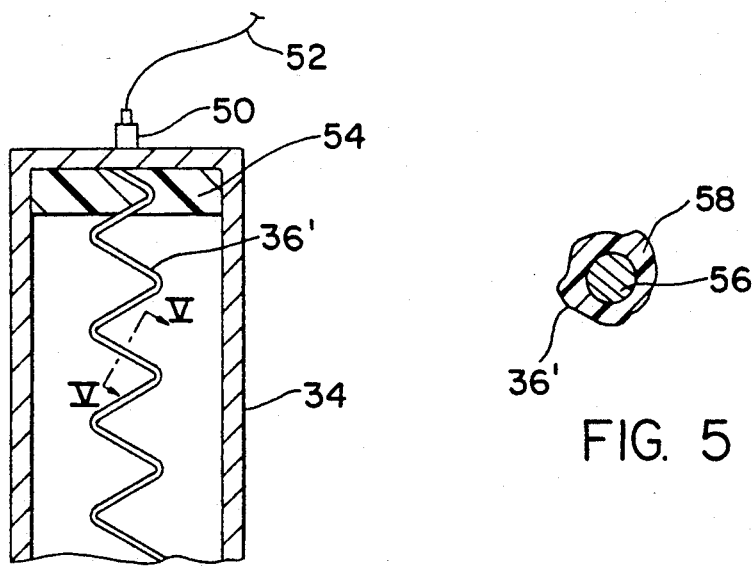
FIG. 4
FIG. 5
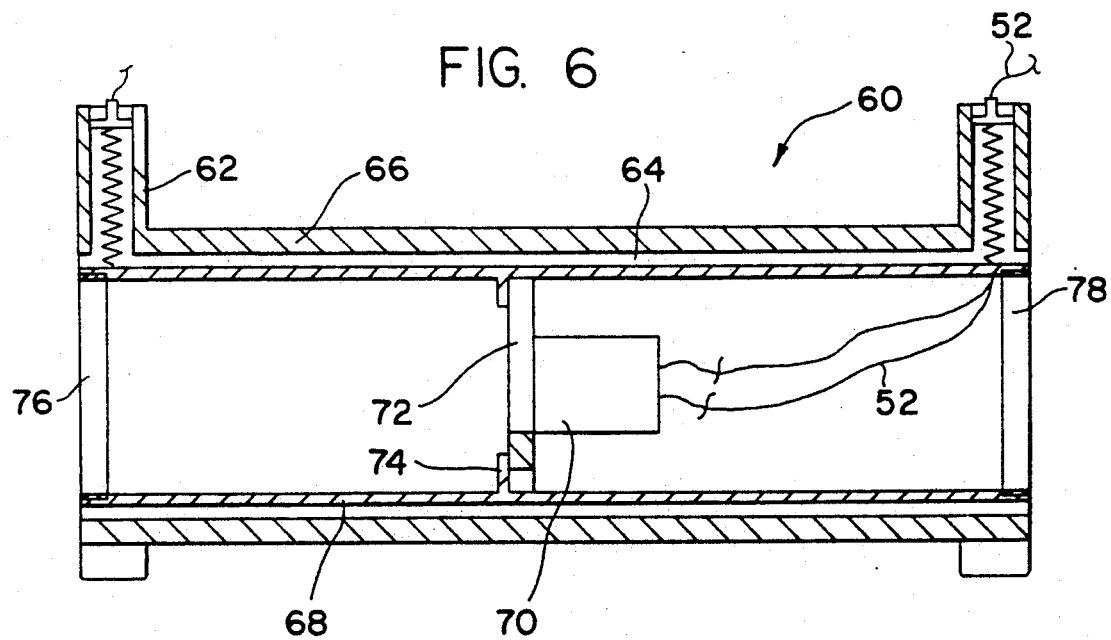
FIG. 6
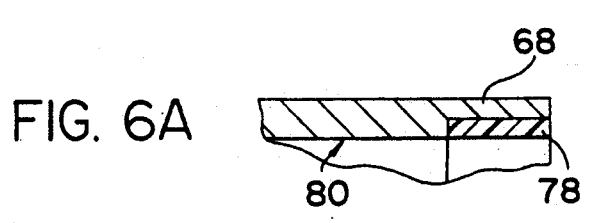
FIG. 6A

VIBRATION ATTENUATION ASSEMBLY

FIELD OF THE INVENTION

An attenuation assembly which protects single axis precision instruments such as single axis accelerometers by reducing the affects of external vibrations or shocks on the instrument.

BACKGROUND DISCUSSION

High precision single axis accelerometers for use in monitoring acceleration changes in various environments have taken on special importance in areas such as in space microgravity experiments. The ability of such high precision accelerometers to detect minute gravitational changes makes it necessary to avoid subjecting the high precision instruments to forces which could adversely influence the performance of the instruments.

The use of fluid damping to prevent accelerometers from having undamped oscillatory dynamic response characteristics which can result in inaccurate measurements is known in the art. For example, U.S. Pat. Nos. 3,813,946 and 4,159,502 discuss the use of fluid damping in association with precision instruments such as gyroscopes and accelerometers. The damping systems of U.S. Pat. Nos. 3,813,946 and 4,159,502 are not well suited for achieving the exacting damping functions required to ensure proper readings of the high precision instruments presently being used, for example, in microgravity tests and low gravity manufacturing processes.

U.S. Pat. No. 4,019,389 illustrates a viscous damper for damping linear vibrations along an axis of a vibrating beam in an attempt to isolate the instruments from the external vibrations. Again, however, the viscous damping arrangement of U.S. Pat. No. 4,019,389 is not well suited for achieving the exacting requirements for properly damping high precision instruments.

SUMMARY OF THE INVENTION

The present invention features a vibration attenuation assembly which is designed to protect single axis accelerometers or any other device which is sensitive to vibration in a single direction when the device is subjected to high shock or vibration in all directions. The vibration attenuation assembly of the present invention is especially suited for reducing high frequency vibration noise in accelerometers which can obscure more critical near constant acceleration inputs, in particular, frequencies as low as several Hz and as high as several hundred Hz. This is accomplished while retaining lateral stability, avoiding angular rotations about the two non principal axis, and avoiding reduced attenuation capabilities due to parasitic inertia. The vibration attenuation device is thus well suited for use in high precision accelerometers placed in a low gravity (e.g. space) environment. The design of the present invention is not limited to such an application, however, as the vibration attenuation assembly is also well suited for other environments.

A first embodiment of the present invention features an inner cylinder (or inner housing) within which one or more accelerometers (or other precision instruments) are mounted. The accelerometers are positioned such that the sensitive axis of the accelerometers is co-aligned with the principal axis of the cylinder. The inner cylinder is held essentially in a concentric, suspended relationship with respect to a larger outer cylinder (or outer housing). Suspension of the inner cylinder within the outer cylinder is achieved through the use of three of more equally spaced springs extending between the exterior of the inner cylinder and the interior of the outer cylinder at or near the cylinder's ends. The springs are arranged perpendicular to the cylinders' axis or at a slight angle to the perpendicular. This arrangement provides for greater longitudinal stiffness. In a preferred embodiment, three springs spaced at 120° intervals are provided at each end of the double cylinder assembly.

A preferred manner of mounting the accelerometer(s) within the inner cylinder is to provide the inner cylinder with an internal circular flange to which a plate of the accelerometer is secured by bolts or the like.

To protect the accelerometer from adverse affects due to, for instance, air currents or floating debris, end caps are provided at the ends of the inner cylinder.

In an alternate embodiment of the present invention, there is provided damping means between the inner and outer cylinders in combination with the springs. One contemplated manner of achieving the damping of the radial springs involves providing a visco elastic coating on the springs. The coating can be applied to the springs in a spraying or dipping process, preferably the coating is thin enough such that the coils are free to expand or retract whereby the stiffness of the springs is maintained relatively low. A latex paint high in elastomeric content would be suitable for the proposes of this invention.

Another embodiment of the present invention features an eddy current damper assembly positioned at one or both ends of the double cylinder assembly. For this embodiment, the inner cylinder is shorter in length than the outer cylinder. Both the outer cylinder and inner cylinder include capped ends. Between the exterior of the capped inner end and the interior of the capped outer end is positioned an eddy current damper assembly. In a preferred embodiment, one or, more preferably, a plurality of copper plates are fastened and extend outward from the inner cap. Extending from the interior surface of the outer cylinder's cap and fixed thereto are an equal number of coil structures which are dimensioned and arranged such that the plates are received therebetween or therein. The inner cylinder is thus free to longitudinally and radially float to a limited extent within the coil structures of the outer cylinder. In a preferred embodiment three copper plates arranged at 120° intervals extend out away from each inner cylinder end cap and are received within three coil structures extending inwardly off each of the outer cylinder's end caps.

The present invention further includes an embodiment wherein a damping fluid is positioned between the exterior of the inner cylinder and the interior of the outer cylinder. In addition to the fluid damping material the previously described springs can also be provided. The inner cylinder can be made essentially the same length as that of the outer cylinder. Furthermore, no coverings or caps are provided at the ends of the inner and other cylinder. Rather, the surface tension of the fluid and the adhesion of the fluid to the interior surface of the outer cylinder and the exterior surface of the inner cylinder is relied upon to maintain the fluid in place. This embodiment has special applicability for in space use wherein the fluid would not as easily be subjected to high gravity forces which could result in fluid leaking permanently out away from the cylinders. A distance between the inner and outer cylinder of about 0.030" to 0.050" or more preferably about 0.040" is suitable for this embodiment when it is used in a low gravity space environment. For all fluid damping embodiments, cross-axis damping is provided by the squeeze film effect.

The damping fluid can be a liquid such as conventional machine oil, glycerol, silicone, or any other suitable damping fluid with the particular material depending upon the damping required, the contemplated use, the duration of use and environmental conditions.

Use of the uncovered or uncapped damping fluid would also be possible for ground testing, but would require a very thin cavity between the exterior of the inner cylinder and the interior of the outer cylinder to ensure that no fluid leakage occurs. A cavity depth of about 0.008" to 0.020" or, more preferably, about 0.015" is contemplated for use in the present invention.

Preferably, for the embodiment using uncapped fluid damping the cylinders are formed of an aluminum alloy which has a relatively porous surface which provides high adhesion between the damping fluid and the cylinder. To prevent capillary action drawing the fluid out of the cylinders, a ring of essentially non-wetting material (e.g., teflon or plastic) is provided at each end of each cylinder.

For each of the previously described embodiments the spring members act as electrical conducts for providing electrical current to the accelerometer and for receiving the signals from the accelerometer(s). This approach removes the additional stiffness that would be encountered if lead wires were used. To protect against short circuiting, a dielectric ring can be provided at each end.

An alternate embodiment of the invention is similar to that described above in that a damping fluid is provided between the exterior of the inner cylinder and the interior of the outer cylinder. The damping fluid is used in conjunction with the springs positioned between the two cylinders at the cylinder ends. Rather than relying on fluid surface adhesion to maintain the damping fluid in place, membranes are provided at each end of the double cylinder assembly. The membranes are used to seal the ends of the cavity formed between the exterior of the inner cylinder and the interior of the outer cylinder. To prevent the flowing fluid's own inertia from altering the readings of the accelerometer as the fluid travels longitudinally between the two ends of the double cylinder assembly, the membrane at each end is formed of a soft elastic material. A soft elastomeric material which is capable of a gradual extension and slow retraction would be well suited for the present invention. A synthetic or natural rubber latex such as that used for surgical gloves is contemplated for use in present invention, although other materials having the above described characteristics could be used in place of a latex material.

In another embodiment of the present invention, damping fluid vent passageways in the forms of longitudinally extending tubes are provided in either the inner cylinder or the outer cylinder to allow for pressure release of the damping fluid inserted between the inner and outer cylinders. The embodiment features radial springs which are contained within radially extending chambers forming part of the outer cylinder and have their inner ends connected to the inner cylinder. A rigid outer cap is provided at both ends of the outer cylinder and a rigid inner cap is provided at both ends of the inner cylinder. A lock screw can be provided to lock the inner cap to the outer cap at one end of the double cylinder arrangement. Thus, during periods where higher acceleration levels are known to exist (e.g. space vehicle launches), the inner cylinder and outer cylinder can be locked in position through use of the locking screw. When, however, the accelerometer is to be placed in use, the lock screw can be retracted (not withdrawn) to a position where the inner cylinder is no longer locked in position but free to move longitudinally within the outer cylinder.

The inner cylinder is provided with a plurality of the above mentioned venting tubes arranged along the inner cylinder's interior wall. A cavity is formed at the inner side of one of the exterior end caps such that intentionally trapped air in the end cavities is free to flow through the vent tubes to equalize pressure in each end cavity. The quantity of damping fluid used is limited to that which will fill the space between the cylinders by capillary action and that which will adhere as a thin film to the end cavity and vent tube walls so as not to interfere with air flow from one end cavity to the other.

An additional embodiment of the invention positions fluid springs within the cavity between the exterior of the inner cylinder and the interior of the outer cylinder. In a preferred embodiment, the fluid springs are conductive and are used in place of the non-fluid springs. The fluid springs can be retained within depressions formed in the interior surface of the outer cylinder or the exterior of the inner cylinder or both.

During periods wherein it is known that the double cylinder assembly will be subjected to high accelerations or impact, a safety feature is provided so as to avoid the dispersion of the fluid forming the fluid springs. In a preferred embodiment, a lock screw is threaded through the outer cylinder. The lock screw has a concave end surface which forms an area in contact with an upper portion of a fluid spring. By designing the cavity in the lock screw and the complementary cavity formed in the exterior surface of the inner cylinder with a sufficient depth, it is possible to screw the lock screw down completely so as to place a flange of the lock screw in contact with the exterior of the inner cylinder. The contact of the flange with the exterior of the inner cylinder seals the fluid spring within a cavity defined by the concave end of the lock screw and the depressions formed in the exterior of the inner cylinder. When testing is to be performed, the lock screw is retracted until the flange at the end of the lock screw is received within a complementary recess formed in the inner surface of the outer cylinder.

The fluid springs can be used either alone or in combination with damping fluid positioned between the exterior of the inner cylinder and the interior of the outer cylinder. For example, an oil can be used in conjunction with conducting mercury fluid springs and non-conductive since the fluid springs are conductive contained in depressions with the oil either retained by capillary action as discussed above or by addition of membranes such as those described above. The damping fluid chosen, of course, must be compatible with the fluid springs.

Alternatively, the conductive fluid springs can be used together with nonconductive fluid springs of a different material. For example, by providing a plurality of depressions along the longitudinal length of the double cylinder arrangement there can be positioned conductive fluid springs toward the ends together with nonconductive fluid springs positioned between the conductive fluid springs or between and to the outside of the conductive fluid springs.

BRIEF DESCRIPTION OF THE PREFERRED EMBODIMENTS

FIG. 4 shows in greater detail one of the spring chambers shown in FIG. 3;

FIG. 5 shows a cross sectional view of the dampened spring taken along line V—V in FIG. 4;

FIG. 6 shows a longitudinally cross sectional view of an additional embodiment of the present invention;

FIG. 6A shows in greater detail one end of the inner cylinder;

DETAILED DESCRIPTION OF THE PREFERRED EMBODIMENTS

Figure 1:
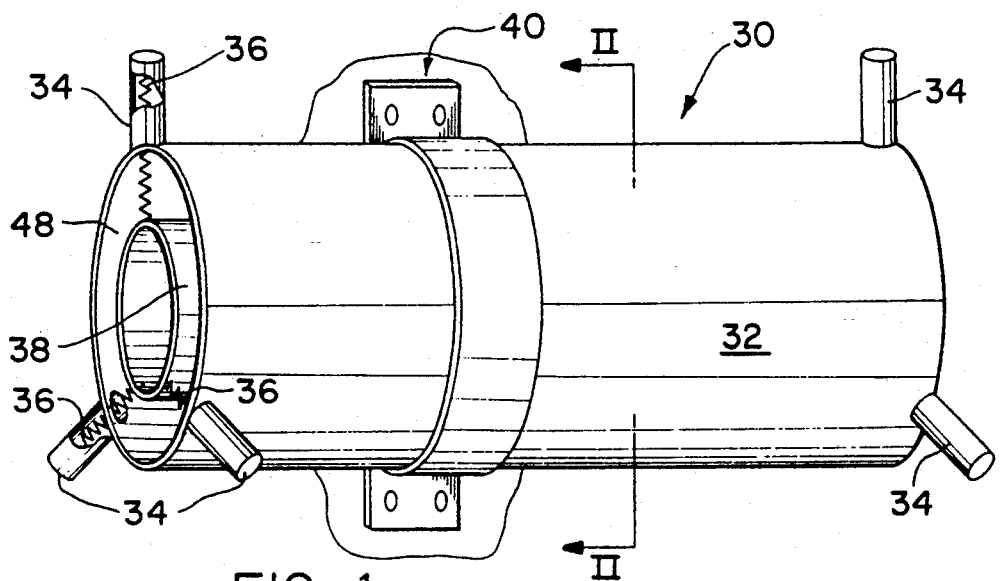
FIG. 1 shows a perspective view of a first embodiment of the present invention.

FIG. 1 shows a perspective view of a first embodiment of the present invention which comprises a vibration attenuation assembly 30 designed to protect single axis instruments such as an accelerometer. Vibration attenuation assembly 30 includes outer cylinder 32 (or housing) with a plurality of spring chambers 34 extending radially thereoff. Spring chambers 34 house springs 36 which have a first end connected to the outer end of spring chamber 34 and a second end connected to inner cylinder 38. In a preferred embodiment, inner cylinder 38 is suspended by three or more equally spaced springs at each end. Preferably, each spring is attached perpendicular to the cylinder axis or, alternatively at a slight angle to the perpendicular inward for greater longitudinal stiffness. For the purposes of this invention, a suitable spring is spring number C0057-006-0620 of Associated Raymond Springs Co. FIG. 1 further illustrates support 40 supporting assembly 30 and attached directly to a fixed surface or, alternatively, attached indirectly (an additional spring or damping assembly) to a fixed structure.

Figure 2:
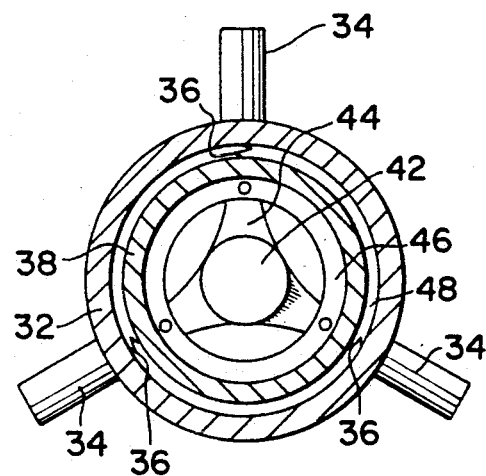
FIG. 2 shows a cross sectional view taken along line II—II of FIG. 1.

FIG. 2 illustrates a cross sectional view take along cross section line II—II in FIG. 1 with the support structure 40 removed from view. As shown in FIG. 2, spring chambers 34 are attached to the exterior of outer cylinder 32 and are positioned essentially at an equal angle from one another (e.g., 120°). FIG. 2 further illustrates accelerometer 42 positioned so as to have its sensitive axis co-aligned with the principle axis of the inner cylinder 38. In a preferred embodiment, accelerometer 42 is fixed in place by accelerometer support bracket 44 which, in this embodiment, features three radially extending arms extending outwardly to flange 46.

Flange 46 is formed along the interior of inner cylinder 38 and includes a plurality of threaded holes for receipt of threaded connection members which pass through each leg of accelerometer support member 44. Radial springs 36 suspend inner cylinder 38 with respect to outer cylinder 32 to form cavity 48. In addition to suspending the inner cylinder and acting as a compressible spring, radial springs 36, even when completely perpendicular to the longitudinal axis, act as a weak longitudinal spring while acting as a stiff lateral spring. The weak or soft longitudinal spring movement is helpful in obtaining a low, longitudinal natural frequency in the system. Lateral stiffness provides a way to reduce coneing and other error producing dynamics.

Radial springs 36 can also function as electrical conductors for the introduction of power and for allowing the passage of signals to and from the accelerometer or accelerometers positioned within the inner cylinder. The radial spring arrangement provides near linear spring response for small longitudinal displacement which is desirable for achieving nondistorted signals from the accelerometer. Radial springs 36, upon being subject to a high impact, will stretch in accordance with their spring constant as well as deflect longitudinally such that larger displacements result in larger than proportional nonlinear response. The nonlinearly response of the radial springs 36 thus provides protection from end impact of the displaceable member inside the accelerometer. Furthermore, the longitudinal softness of the springs and slight longitudinal distortion of the springs, upon forces being applied along the sensitive axis of the accelerometer, have been found not to generate a persistent hysteresis which would be detrimental to testing, calibrating or utilizing an accelerometer.

Figure 3:
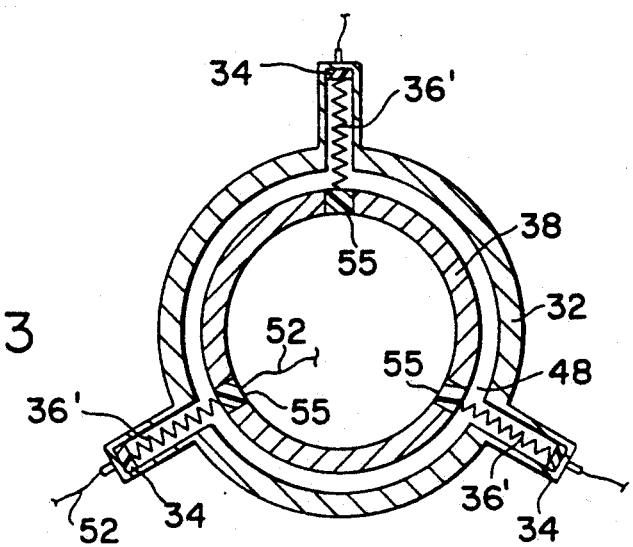
FIG. 3 shows in cross section an alternate embodiment of the present invention.

FIG. 3 illustrates a cross sectional view taken through the spring chamber 34 of an alternate embodiment of the present invention. To simplify the illustration, the accelerometer and accelerometer's mounting bracket have been removed from the view. FIG. 3 illustrates an embodiment which is similar to that shown in FIG. 2 with the exception that radial springs 36 found in the embodiment of FIG. 2 have been modified to include damping means. Accordingly, modified radial springs 36' (FIG. 3) provide both a spring function and a damping function as inner cylinder 38 moves longitudinally and radially with respect to outer cylinder 32.

FIG. 4 shows in greater detail one of the spring chambers 34 shown in FIG. 3. As shown in FIG. 4, spring chamber 34 includes electrical connector 50 from which wire or wires 52 extend. Spring chamber 34 also includes a spring receiving means 54 which receives one end of modified radial spring 36'. Spring receiving means 54 is formed of a dielectric material such as a ceramic or epoxy so as to insulate the spring from contact with chamber 34. As shown in FIG. 3, an insulating block 55 is provided at the other end to insulate the spring from contact with inner cylinder 38. Wire 52 extends to the accelerometer from the end of spring 36'.

FIG. 5 illustrates a cross sectional view of spring 36' taken along cross section line V—V of FIG. 4. Modified spring 36' is comprised of spring member 56 having its exterior coating with covering 58. Covering 58 is preferably formed of a visco elastic material such as an elastomeric paint (e.g., latex paint with elastomeric components). The thickness of the covering 58 can be varied in accordance with the anticipated environment which modified springs 36' will be used. However, too thick a covering can cause excess rigidity especially when the covering of one section of spring member 56 becomes integral with the covering of an over lying section of spring member 56. Preferably, the covering 58 is applied in a spraying process.

FIG. 6 shows an alternate embodiment of the present invention having particular applicability to a low gravity environment such as those found in space. The general arrangement shown in FIG. 6 is similar to that which is shown in perspective in FIG. 1. FIG. 6 shows a cross sectional longitudinal view of the vibration attenuation assembly 60 having a plurality of spring chambers 62. Cavity 64 which lies between the interior of outer cylinder 66 and the exterior of inner cylinder 68 forms a capillary ring within which damping fluid is provided. The damping fluid provided within cavity 64 relies on surface tension to achieve a damping function and to avoid leakage of the damping fluid. Accordingly, cavity 64 has a depth of about 0.030" to 0.050", or more preferably, about 0.040". In other words, the fluid layer within cavity 64 has an average thickness of about 0.030" to 0.050" or more preferably about 0.040".

Springs 36 as in FIG. 1 provide an electrical connection for passing current to and from accelerometer 70. Accelerometer 70 is retained on accelerometer bracket 72 and flange 74. To provide sufficient surface adhesion between the exterior of the inner cylinder and the interior of the outer cylinder, those surfaces of the cylinders are formed of a relatively porous material. For example, an unfinished or unpolished aluminum alloy would be suitable for the purposes of the present invention.

FIG. 6 and 6A illustrate the use of non-wetting rings 76 and 78 provided at opposite ends of inner cylinder 68 and/or outer cylinder 62. As shown in FIG. 6A, non-wetting ring 78 can be inserted within a slotted recess formed in the interior 80 of inner cylinder 68. Non-wetting rings 76 and 78 provide a function of decreasing the surface adhesion between the fluid and the interior 80 so as to reduce the tendency for the damping fluid to be drawn out and away from the ends of vibration attenuation assembly 62 in a capillary process. Thus, non-wetting rings 76 and 78 are formed of a material having a smooth exterior surface such as teflon, a dense plastic or a finely polished metal.

As mentioned above, the embodiment illustrated in FIG. 6 is specifically suited for use in low gravity environments such as on a space vehicle. For use in an environment subject to higher gravitational forces such as on the surface of the earth, the non-covered cavity 64 can be utilized but would have to be of a depth which is about 0.020" or lower.

Figure 7:
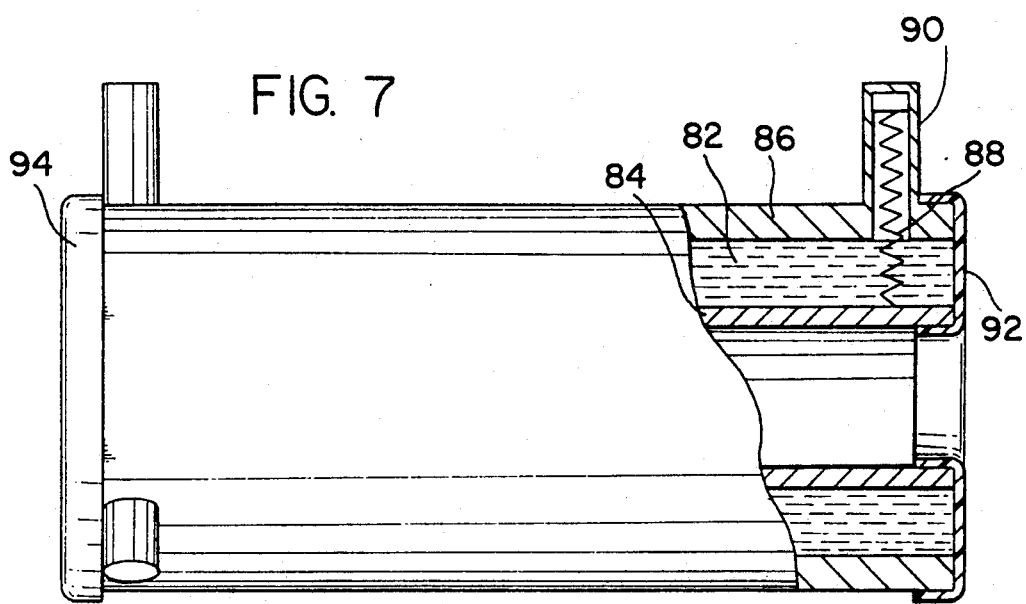
FIG. 7 shows in partially cut away view an alternate embodiment of the present invention.

FIG. 7 shows an alternate embodiment of the present invention which is similar to that described for FIG. 6 in that a fluid damping cavity 82 is provided between the exterior of inner cylinder 84 and the interior of outer cylinder 86. Again, inner cylinder 84 would be suspended from outer cylinder 86 by way of a plurality of spaced radial springs 88 contained within corresponding spring chambers 90. The embodiment of FIG. 7, however, adds diaphragms 92 and 94 to cover the open ends of cavity 82. Diaphragms 92 and 94 can be joined to the interior or exterior of cylinders 84 and 86 by any appropriate means such as adhesion with or without mechanical fasteners. As the membrane material must comply with cylinder motion, it must be made of a material having longitudinal material softness. In other words, diaphragms 92 and 94 must expand and retract in a manner which avoids the development of additional spring forces. One embodiment of the present invention utilizes a diaphragm formed of a natural or synthetic elastomeric latex material.

Figure 8:
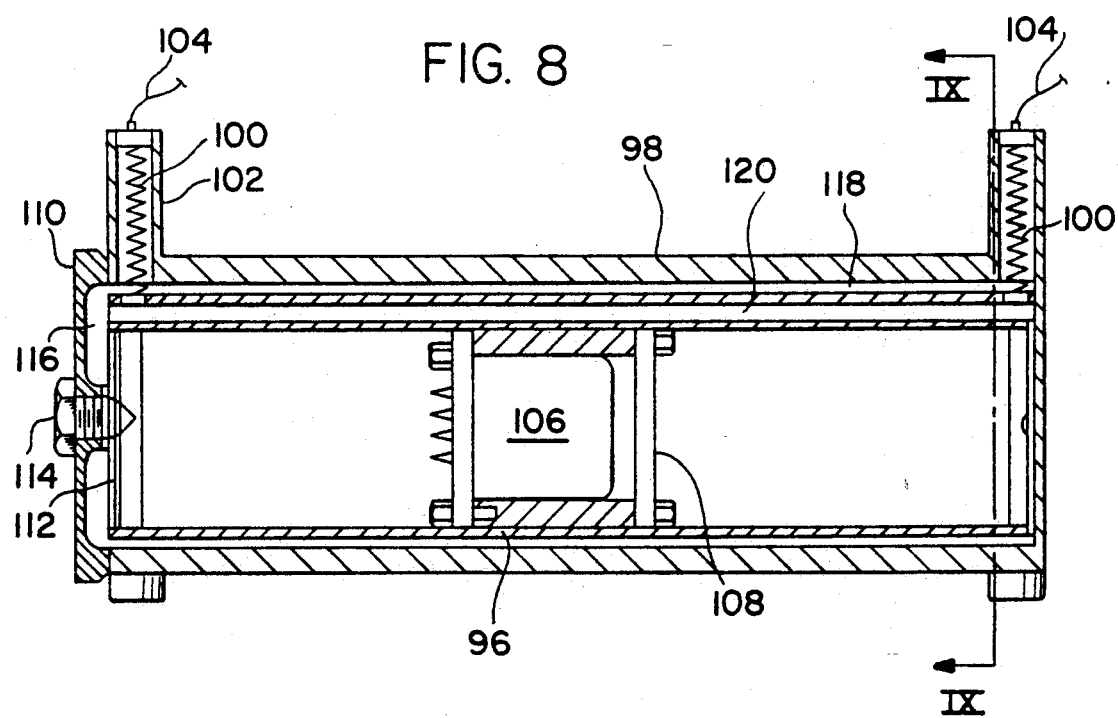
FIG. 8 shows a longitudinal, cross-sectional view of an additional embodiment of the present invention.

FIG. 8 illustrates an alternate embodiment of the present invention which utilizes both capillary action of a fluid and the longitudinal softness of radially extending springs to achieve a damping function of the movement of inner cylinder 96 with respect to outer cylinder 98. As in the previous described embodiments, radial springs 100 are retained within spring chambers 102 and are in electrical communication with electric plug assembly 104. Accelerometer 106 is secured within the interior of inner cylinder 96 and includes board 108 upon which can be inserted chips or similar electrical devices.

At one end of outer cylinder 98 is positioned, in fixed fashion, outer cylinder end cap 110. At that same end, inner cylinder 96 includes inner cylinder end cap 112. Inner cylinder end cap 112 is fixed in position with respect to outer cylinder end cap 110 by use of lock screw 114. Lock screw 114 extends through a threaded hole in end cap 110 and is dimensioned so as to be received within a threaded hole formed within inner cylinder end cap 112. This locking arrangement between outer cylinder end cap 110 and inner cylinder end cap 112 provides a safety factor to avoid damage to the vibration attenuation assembly or the accelerometer due to large impact or gravitational forces. For example, if the present invention is to be positioned within a vehicle to be launched in space, during the launching high gravitational forces are created. Thus, lock screw 114 would be inserted within end cap 110 so as to prevent damage to the present invention due to the inner cylinder shifting too far within outer cylinder 98.

Figure 9:
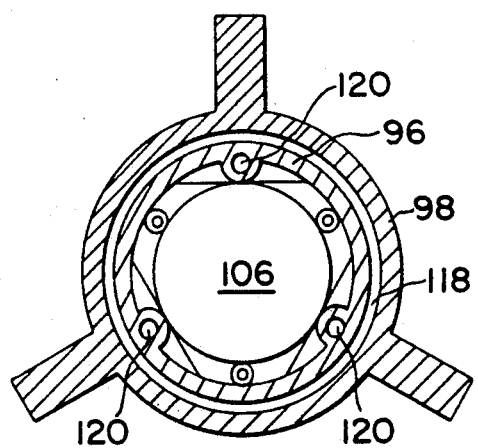
FIG. 9 shows a cross sectional view taken along cross section line IX—IX found in FIG. 8.

FIG. 8 further illustrates another embodiment of the invention having a main damping fluid cavity 118 positioned between the interior of outer cylinder 98 and the exterior of inner cylinder 96. Main damping fluid cavity 118 opens into damping fluid end cavity 116. Extending longitudinally and opening into damping fluid end cavity 116 are a plurality of venting passageways 120 which, as shown in FIG. 9, are spaced circumferentially about inner cylinder 96. The present invention also contemplates positioning vent passageways 120 on the interior of outer cylinder 98 rather than the position shown in FIG. 9.

When lock screw 114 is retracted (but not completely withdrawn), inner cylinder end cap 112 will be detached from outer cylinder end cap 110 such that inner cylinder 96 will be free to shift longitudinally with respect to outer cylinder 98. To dampen the shifting movement of inner cylinder 96 with respect to outer cylinder 98, a damping fluid such as glycerol, silicon or motor oil is spaced within main damping fluid cavity 118, damping fluid end cavity 116, and, at least partially, within vent passage way 120.

With the damping fluid partially filling one end of vent passage way 120, there is provided a means to compensate for the pressure differentials which arise when inner cylinder 96 shifts within outer cylinder 98. In addition, both the surfaces defining the main damping fluid cavity 118 and the venting passageway 120 are relatively porous such that the adhesion between the fluid and the porous surfaces provides an added degree of damping. Moreover, as the embodiment shown in FIG. 8 is essentially a sealed system there is avoided the problems associated with damping fluid leakage and thus the embodiment has equal applicability both in high gravitation environments and low gravitation environment.

Figure 10:
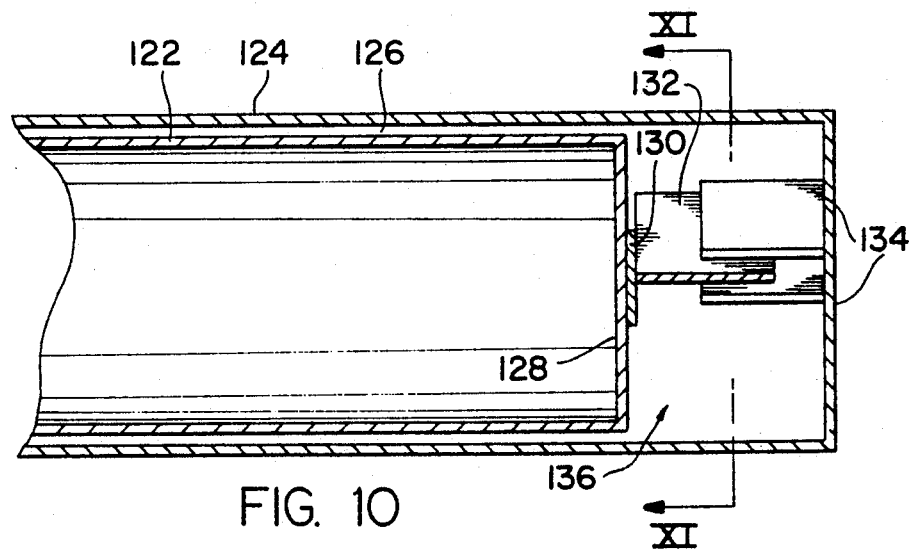
FIG. 10 shows, in cut-away, a longitudinal, cross-sectional view of an additional embodiment of the present invention taken along cross-section line X—X in FIG. 11.
Figure 11:
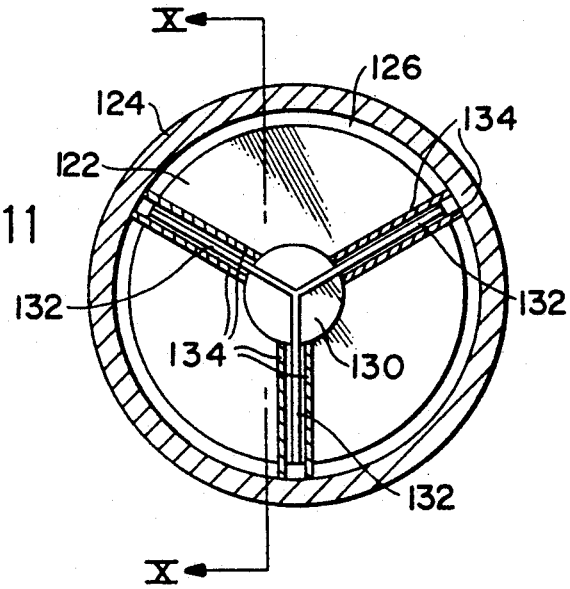
FIG. 11 shows an end view of the embodiment shown in FIG. 10 taken from the view point of line XI—XI in FIG. 10.
Figure 12:
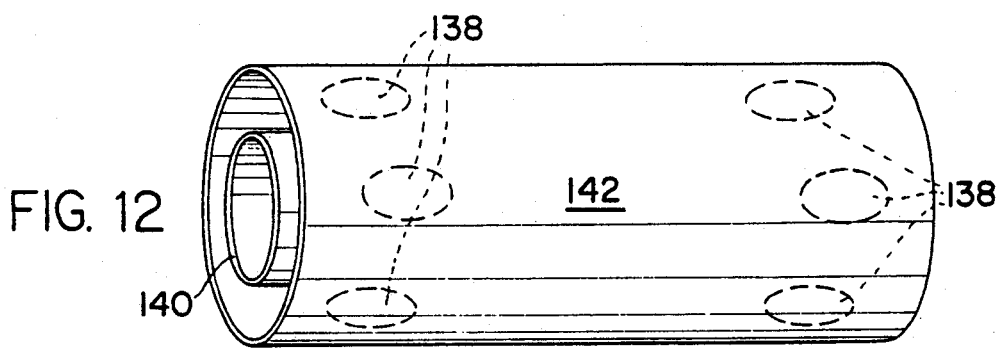
FIG. 12 shows in perspective an additional embodiment of the present invention which utilizes fluid springs.

FIGS. 10 and 11 illustrate still another embodiment of the present invention. As shown in FIG. 10, inner cylinder 122 extends longitudinally within outer cylinder 124 and a clearance 126 is maintained between the exterior surface of inner cylinder 122 and the interior surface of outer cylinder 124. Inner cylinder 122 includes end cap 128 and mounting disk 130 positioned at the center and external end cap 128. Extending radially off mounting disk 130 are a plurality of conducting plates 132 which are preferably arranged to extend radially out from a longitudinal center line as well as longitudinally out away from mounting disk 130. Plates 132 extend between or within coil structures 134 which maintain plates 132 in floating condition and provide a damping function to plates 132 as plate 132 move longitudinally within coil structure 134. The eddy current damping assembly designated 136 can be provided at both ends of inner cylinder 122 or only at one end. The eddy current damper option has the advantage of providing translational damping in all directions.

Figure 13:
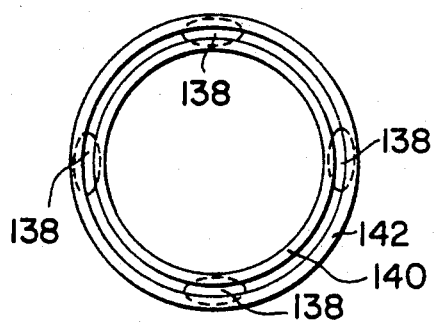
FIG. 13 shows an end view of that which is shown in FIG. 12.
Figure 14:
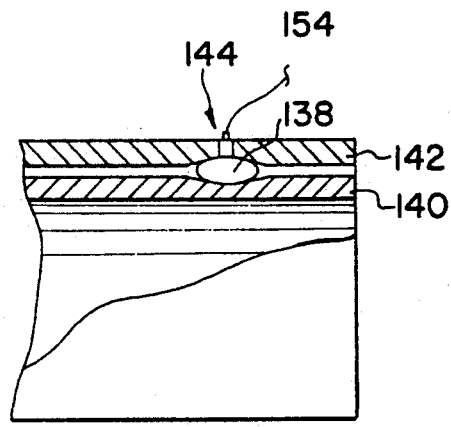
FIG. 14 shows in a cut-away view a portion of that which is shown in FIG. 12.
Figure 15:
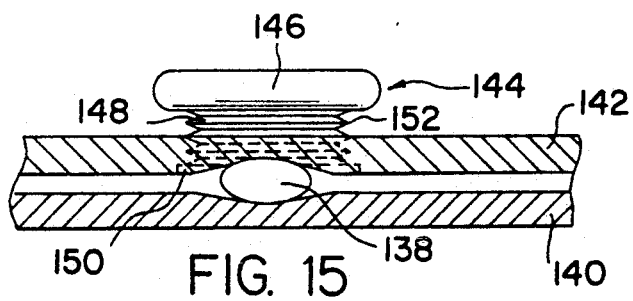
FIG. 15 illustrates a lock screw positioned over the fluid springs shown in FIG. 14.

FIGS. 12-15 illustrate further embodiments of the present invention. The embodiments illustrated in FIGS. 12 through 15 feature an alternate spring system which includes fluid springs 138. The fluid springs are formed of a fluid which has a high surface tension, low wetting potential and also is conductive such that the fluid springs can complete an electrical circuit in a similar manner as radial springs 36. A suitable material for the fluid springs of this invention includes mercury. As shown in FIGS. 13-15, globular fluid springs 138 are retained in depressions formed in both inner cylinder 140 and outer cylinder 142. As shown in FIG. 14, filling conduit 144 can be provided for allowing the initial filling of the fluid spring or the replacement of a fluid spring dislocated due to exposure to a high acceleration.

FIG. 15 illustrates an alternate manner of providing a fluid conduit 144 for the positioning of fluid spring 138. Fluid conduit 144 in FIG. 15 is plugged by plug 146 which has threaded main body 148. Threaded main body 148 includes a flanged end portion 150 as well as concave end 152 partially defining the fluid spring depressions. The embodiment in FIG. 15, 5 provides a safety feature to avoid dislocation of fluid springs 138 when high acceleration forces are anticipated. For example, upon lift off of a space vehicle, fluid spring 138, depending on the surface adhesion and the depth of the depressions, could possibly become dislocated. By threading plug 146 until flange 150 contacts the exterior surface of inner cylinder 140, fluid 138 can be essentially sealed from leakage out of the depressions. When the accelerometer is to be put to use, plug 146 is retracted to the position shown in FIG. 15 such that fluid spring 138 can perform its damping and spring function. FIG. 15 also shows that the depression is formed by sloping or tapering walls which intersect.

Each fluid spring 138 can be electrically insulated from outer cylinder 142 and electrically connected to a terminal 154 (FIG. 14) for the feeding through of electrical power and signals. With the use of an electrically conductive spring fluid, each fluid spring can then be used as an insulated electrical path. Fluid spring 138 can be used alone or in combination with the previous described damping systems.

Figure 16:
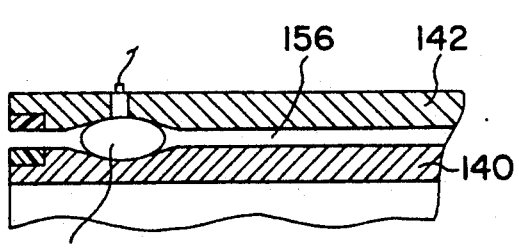
FIG. 16 shows in a cut-away view an alternate embodiment of the invention utilizing fluid springs in combination with secondary fluid damping material.

FIG. 16 illustrates fluid spring 138 retained between inner cylinder 140 and outer cylinder 142 in a manner similar to that shown in FIG. 14. FIG. 16 also illustrates the additional use of secondary damping fluid 156 positioned between the interior surface of outer cylinder 142 and the exterior surface of inner cylinder 140. Again, capillary action can be relied upon to maintain the secondary damping fluid in position within cavity 156. Alternatively, the use of membranes as discussed above can be relied upon. The secondary damping fluid has the advantage of providing a low thermal resistance path for cooling of the accelerometer.

Figure 17:
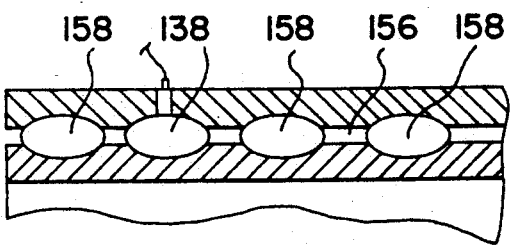
FIG. 17 shows an additional embodiment of the present invention which positions secondary fluid springs along and the adjacent to the primary fluid springs.

FIG. 17 illustrates yet another embodiment of the present invention wherein, rather than relying upon secondary damping fluid 156, additional (nonconductive) fluid springs are arranged serially along the longitudinal length of cavity 156. The damping fluid and fluid springs also offer the advantage of a low thermal resistance path for the elimination of heat from the enclosed accelerometer.

Although the present invention has been described with reference to preferred embodiments, the invention is not limited to the details thereof. Various substitution and modifications will occur to those of ordinary skill in the art and such substitution and modifications are intended to fall within the spirit and scope of the invention as defined in the dependent claims.

What is claimed is:

1. A vibration attenuation assembly for precision instruments, comprising:
   an inner housing having a first end, a second end, an exterior surface and an interior surface defining a hollow interior with the hollow interior adapted to receive a precision instrument;
   an outer housing having a first end, a second end, and an interior surface defining a hollow interior, said inner housing being positioned within the hollow interior of said outer housing;
   a plurality of fluid damping spring positioned between the exterior surface of said inner housing and the interior surface of said outer housing, said fluid damping springs being comprised of a globular fluid body with said globular fluid body of said fluid springs being in contact with the exterior surface of said inner housing and the interior surface of said outer housing; and
   means for positioning said springs substantially at predetermined positions with respect to at least one of said housing surfaces.

2. A vibration attenuation assembly as recited in claim 1 wherein said positioning means includes depressions formed in the interior surface of said outer housing, and said fluid springs being retained within said depressions.

3. A vibration attenuation assembly as recited in claim 2 wherein said positioning means further comprises complimentary depressions formed in the exterior surface of said inner housing so as to further retain said fluid springs positioned therein.

4. A vibration attenuation assembly as recited in claim 3 further comprising a locking plug having a threaded main body with a flange extending around one end of said main body, said locking plug having a cavity formed at the one end of said main body so as to define one of said depressions.

5. A vibration attenuation assembly as recited in claim 1 wherein said fluid springs are formed of a conductive fluid.

6. A vibration attenuation assembly as recited in claim 5 further comprising a plurality of non-conductive fluid springs positioned adjacent said conductive fluid springs.

7. A vibration attenuation assembly as recited in claim 5 wherein the conductive fluid of said conductive fluid springs is mercury.

8. A vibration attenuation assembly as recited in claim 1 further comprising non-conductive damping liquid positioned between the exterior surface of said inner housing and the interior surface of said outer housing and adjacent said conductive fluid springs.

9. A vibration attenuation assembly as recited in claim 8, wherein the space between the exterior surface of said inner housing and the interior surface of said outer housing is open ended at both ends and the non-conductive damping liquid is retained by surface adhesion between the non-conductive damping liquid and the exterior surface of said inner housing and the interior surface of said outer housing.

10. A vibration attenuation assembly as recited in claim 9, wherein each end of said outer housing includes a non-wetting-ring provided on the interior surface and each end of said inner housing includes a non-wetting-ring provided on the exterior surface.

11. A vibration attenuation assembly as recited in claim 9, wherein the exterior surface of said inner housing is spaced about 0.03 to 0.05 of an inch from the interior surface of said outer housing when said vibration attenuation assembly is designed for a low gravity space environment.

12. A vibration attenuation assembly as recited in claim 11, wherein said inner and outer housings are shaped as cylinders and are formed of an aluminum alloy with a porous surface.

13. A vibration attenuation assembly as recited in claim 9, wherein the exterior surface of said inner housing is spaced about 0.008 to 0.02 of an inch from the interior surface of said outer housing when said vibration attenuation assembly is designed for a non-space high gravity environment.

14. A vibration attenuation assembly as recited in claim 1, wherein said inner and outer housings are shaped as cylinders.

15. A vibration attenuation assembly, comprising:
an inner housing having a first end, a second end, an exterior surface and an interior surface defining a hollow interior;
an outer housing having a first end, a second end, and an interior surface defining a hollow interior, said inner housing being positioned within the hollow interior of said outer housing;
a plurality of fluid damping springs positioned between the exterior surface of said inner housing and the interior surface of said outer housing;
said assembly further comprising damping fluid positioned between the exterior surface of said inner housing and the interior surface of said outer housing and adjacent said fluid springs; and
wherein the space between the exterior surface of said inner housing and the interior surface of said outer housing is open ended at both ends and the damping fluid is retained by surface adhesion between the damping fluid and the exterior surface of said inner housing and the interior surface of said outer housing.

16. A vibration attenuation assembly as recited in claim 15, wherein each end of said outer housing includes a non-wetting ring provided on the interior surface and each end of said inner housing includes a non-wetting-ring provided on the exterior surface.

17. A vibration attenuation assembly as recited in claim 15, wherein the exterior surface of said inner housing is spaced about 0.03 to 0.05 of an inch from the interior surface of said outer housing when said vibration attenuation assembly is designed for a low gravity space environment.

18. A vibration attenuation assembly as recited in claim 17, wherein said inner and outer housings are formed of an aluminum alloy with a porous surface.

19. A vibration attenuation assembly as recited in claim 15, wherein the exterior surface of said inner housing is spaced about 0.008 to 0.02 of an inch from the interior surface of said outer housing when said vibration attenuation assembly is designed for a non-space high gravity environment.

20. A vibration attenuation assembly as recited in claim 15, wherein said inner and outer housings are in the shape of cylinders.

21. A vibration attenuation assembly as recited in claim 15, further comprising depressions formed in the interior surface of said outer housing, and said fluid springs being retained within said depressions.

22. A vibration attenuation assembly as recited in claim 21, wherein complimentary depressions are formed in the exterior surface of said inner housing so as to further retain said fluid springs positioned therein.

23. A vibration attenuation assembly as recited in claim 22, further comprising a locking plug having a threaded main body with a flange extending around one end of said main body, said locking plug having a cavity formed at the one end of said main body so as to define one of said depressions.

24. A vibration attenuation assembly as recited in claim 23, wherein said threaded locking plug is dimensioned and arranged such that, when said threaded locking plug is threaded so as to place said flange in contact with the exterior surface of said inner housing, the fluid spring is retained in sealed fashion between said locking plug and exterior surface of said inner housing.

25. A vibration attenuation assembly as recited in claim 15, wherein said fluid damping springs are formed of a conductive fluid and said damping fluid positioned between the exterior surface of said inner housing and the interior surface of said outer housing is formed of a non-conductive liquid.

26. A vibration attenuation assembly as recited in claim 25, wherein the conductive fluid of said fluid damping springs is mercury.

27. A vibration attenuation assembly, comprising:

an inner housing having a first end, a second end, an exterior surface and an interior surface defining a hollow interior;

an outer housing having a first end, a second end, and an interior surface defining a hollow interior, said inner housing being positioned within the hollow interior of said outer housing;

a plurality of fluid damping springs positioned between the exterior surface of said inner housing and the interior surface of said outer housing, and said fluid damping springs being formed of a conducting fluid that is in contact with both said inner and outer housing.

28. A vibration attenuation assembly as recited in claim 27, further comprising a plurality of non-conductive fluid springs positioned adjacent said conductive fluid springs.

29. A vibration attenuation assembly as recited in claim 27, further comprising depressions formed in the interior surface of said outer housing, and said fluid springs being retained within said depressions.

30. A vibration attenuation assembly as recited in claim 27, wherein the conductive fluid of said fluid damping springs is mercury.

31. A vibration attenuation assembly as recited in claim 27, wherein said inner and outer housings are in the shape of cylinders.

32. A vibration attenuation assembly as recited in claim 27, further comprising damping fluid positioned between the exterior surface of said inner housing and the interior surface of said outer housing and the interior surface of said outer housing and adjacent said fluid damping springs.

33. A vibration attenuation assembly as recited in claim 15, wherein each end of said outer housing includes a non-wetting-ring provided on the interior surface and each end of said inner housing includes a non-wetting-ring provided on the exterior surface.

* * * * *